United States Patent [19]

Chai

[11] Patent Number: 4,907,818
[45] Date of Patent: Mar. 13, 1990

[54] SAFETY DEVICE TO PREVENT BABY CARRIAGES FROM BEING ACCIDENTALLY FOLDED

[76] Inventor: Mong H. Chai, No. 41, Sec. 1, Chin Sha ST., Tainan, Taiwan, R.O.C., Taiwan

[21] Appl. No.: 326,446

[22] Filed: Mar. 22, 1989

Related U.S. Application Data

[63] Continuation of Ser. No. 91,127, Aug. 31, 1987, abandoned.

[51] Int. Cl.$^4$ ................................................. B62B 7/08
[52] U.S. Cl. ..................................... 280/642; 280/650
[58] Field of Search ............... 280/642, 644, 649, 650, 280/658; 297/DIG. 4

[56] References Cited

U.S. PATENT DOCUMENTS 4,529,219  7/1985  Shamie .................................. 280/642
4,632,421  12/1986  Shamie ................................. 280/642

FOREIGN PATENT DOCUMENTS 140710  3/1949  Australia ............................. 280/649

Primary Examiner—David M. Mitchell
Attorney, Agent, or Firm—Lowe, Price, Leblanc, Becker & Shur

[57] ABSTRACT

This invention relates to a safety device to prevent a baby carriage from being misfolded and in particular to one including a handlebar, two engaging members and two linking rods with a protuberance on each rod. An actuating lever releases the engaging members from the protuberances of the linking rods and a stop block is provided at one side of the rear supports to block the released engaging member from moving further backwardly at the same side. A pair of front supports and rear supports are also provided. The handlebar, the front supports and the linking rods rotate on three axes when the stop block is depressed and the engaging members have passed the stop block.

1 Claim, 5 Drawing Sheets

SAFETY DEVICE TO PREVENT BABY CARRIAGES FROM BEING ACCIDENTALLY FOLDED

This application is a continuation of Application Ser. No. 07/091,127, filed Aug. 31, 1987, and now abandoned.

BACKGROUND OF THE INVENTION

It has been reported occasionally that babies can be hurt by baby carriages which accidentally fold or collapse. Some injuries have been severe and resulted in-permanent injury. It is therefore a goal of the instant invention to prevent such tragedies from happening.

SUMMARY OF THE INVENTION

This invention relates to a safety device to prevent a baby carriage from being accidentally folded or collapsed.

It is a primary object of the present invention to provide a safety device which will prevent a baby carriage from being folded by accident and to protect babies from being injured thereby.

It is another object of this invention to provide a safety device which will prevent baby carriages from being accidentally folded that is reliable and durable.

It is still another object of this invention to provide a safety device which will prevent baby carriages from being accidentally folded that is simple in construction and relatively inexpensive to manufacture.

With the foregoing and other objects in view, the invention consists of certain novel features of construction and arrangement of parts that will be hereinafter more specifically described, claimed and illustrated in the accompanying drawings in which:

DETAILED DESCRIPTION OF THE INVENTION

Figure 1:
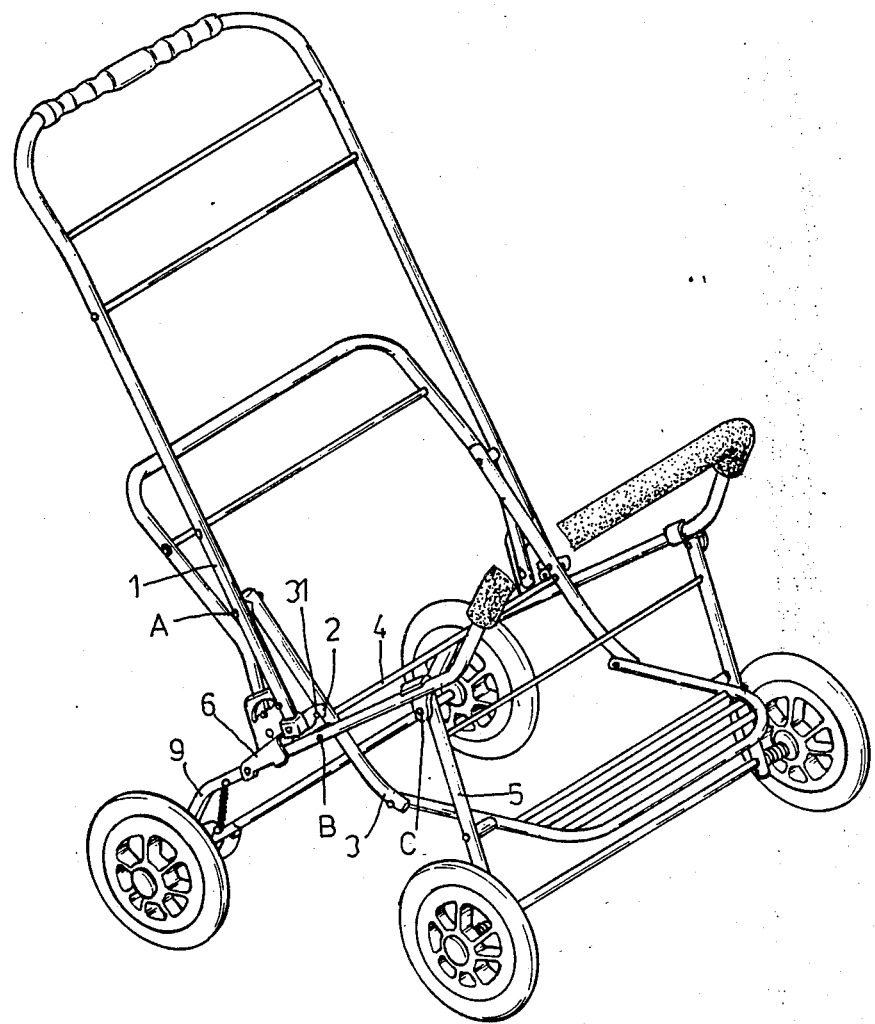
FIG. 1 is a perspective view of a baby carriage utilizing the safety device of this invention to prevent the carriage from being accidentally folded.

With reference to the drawings and to FIG. 1 in particular, there is shown in perspective the baby carriage of this invention using the safety device to prevent the carriage from being accidentally collapsed or folded. The safety device consists of an engaging latch member 2 with an actuating lever 4 which normally engages a stud 31 on linking rods 3 when the carriage is in the upright position. Depressing actuating lever 4 unlatches engaging latch member 2 from stud 31 and as will be subsequently explained upon depressing stop block 6 the engaging latch member 2 may be moved backwardly whereby handlebar 1 and the front supports 5 rotate clockwise on axes A and C, respectively, and the linking rods 4 rotate counterclockwise on axis B. The carriage then folds into a collapsed position for carrying or storing.

Figure 2:
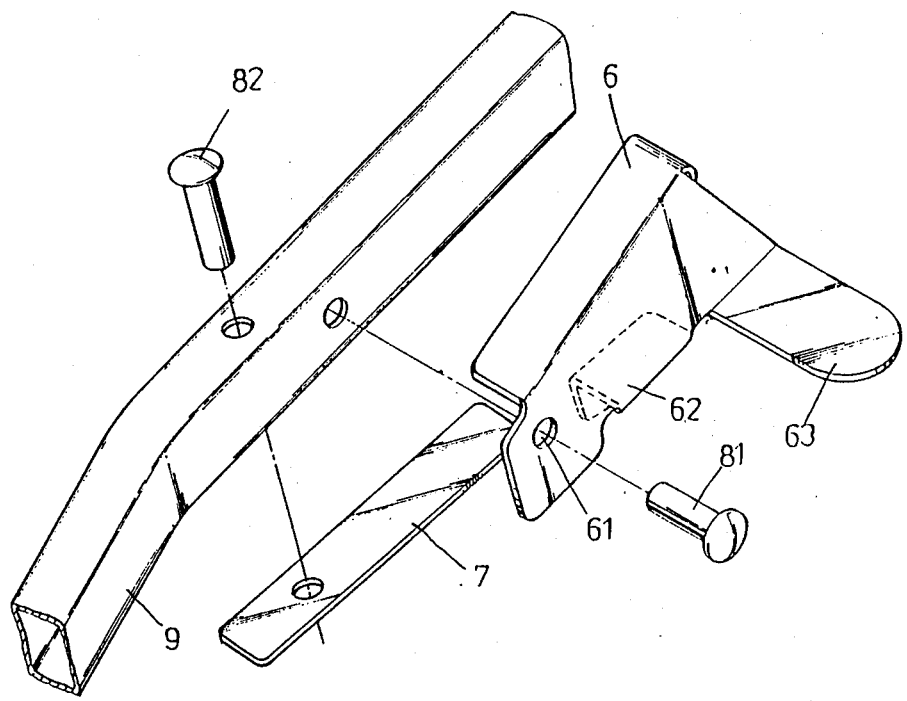
FIG. 2 is an exploded view of the safety device of this invention showing the engaging latch member engaged to the linking rod.

With reference to FIG. 2, there is shown the stop block 6 connected with rear support 9 by a rivet 81. The stop block 6 is L-shaped with its longer leg facing outwardly of rear support 9. The front outward bottom side of block 6 mounts a lug 63 used to depress stop block 6 as will be subsequently explained. There is another L-shaped member 62 at the center inward bottom side of the long let of block 6 which in contact with bearing spring 7. Bearing spring 7 is also connected to the rear support 9 by rivet 82. This bearing spring 7 serves to restore stop block 6 to its original position after the stop block 6 has been depressed.

Figure 3:
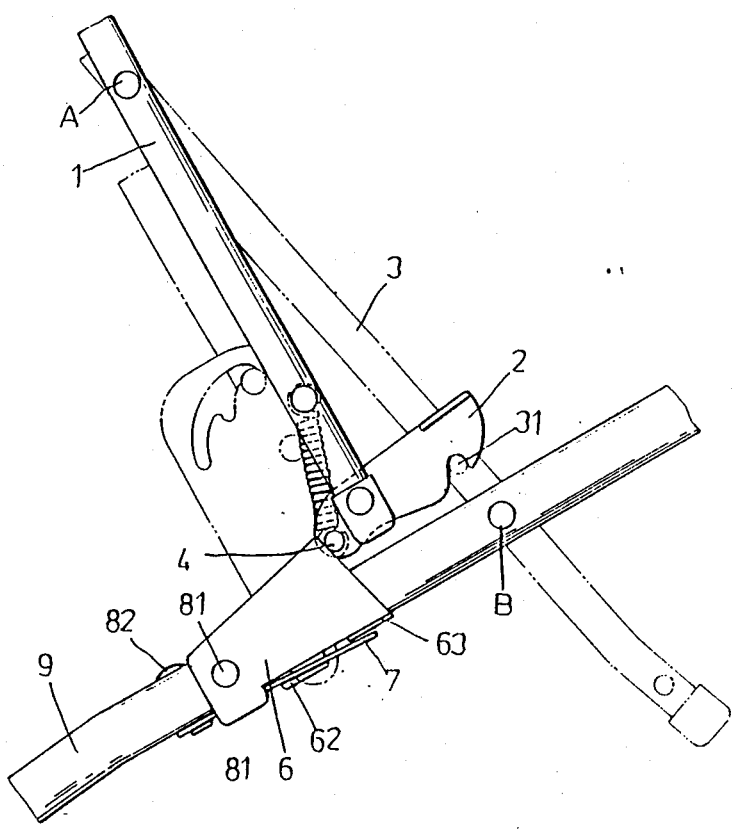
FIG. 3 is a fragmentary view showing the engaging latch member engaging the linking rod stud in the normal upright position.

With reference to FIG. 3 there is shown an engaging latch member 2 engaging the stud 31 on linking rod 3 when the carriage is in the upright position.

Figure 4:
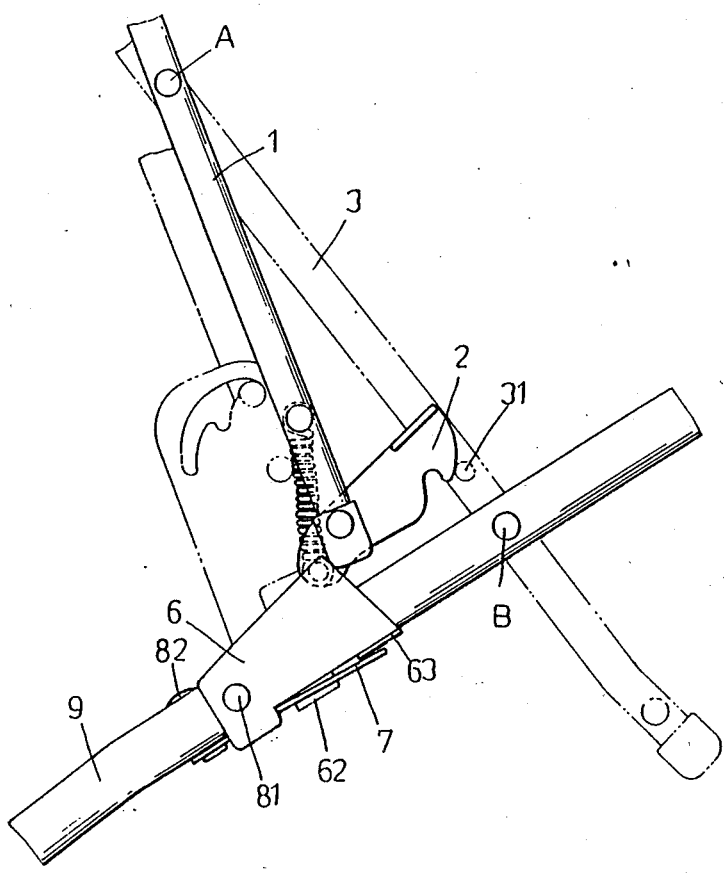
FIG. 4 is a fragmentary view similar to FIG. 3 but showing the engaging latch member released from the linking rod and abutting the stop block.

In FIG. 4 there is shown latch member 2 disengaged from stud 31 but abutting stop block 6. This is an intermediate position in moving the carriage from an upright position to a folded collapsed position. In this position, the carriage is still in the upright position and will not fold so that if the latch member 2 is inadvertently disengaged from stud 31, handlebar 1 will not rotate to a folded position because of engaging the stop block 6.

Figure 5:
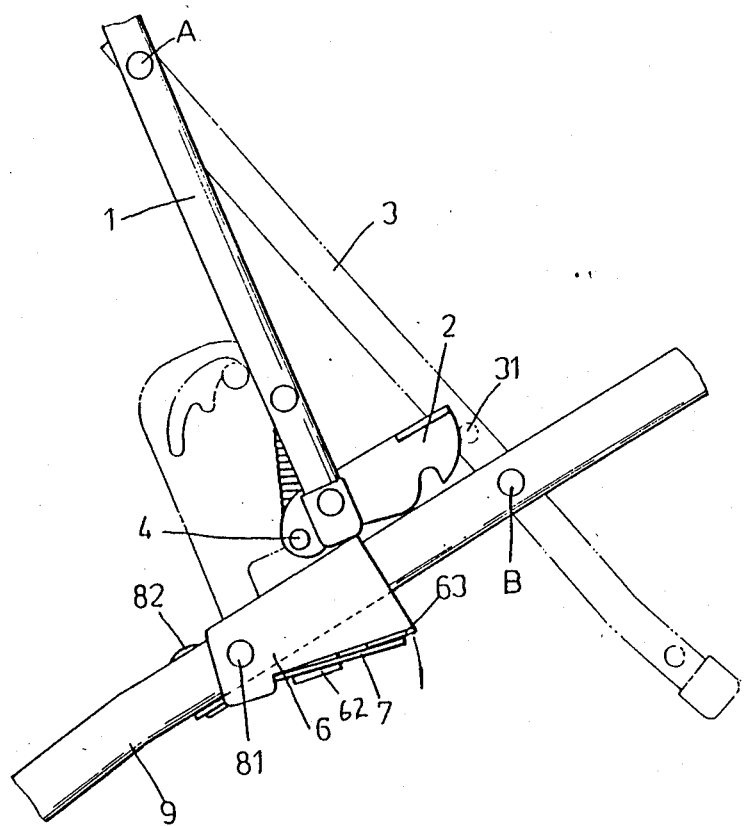
FIG. 5 is a view similar to FIGS. 3 and 4 but showing the stop block depressed so that the engaging member is movable to fold the baby carriage.

With reference to FIG. 5, when pressure is applied to arm 63, stop block 6 will depress against spring 7 permitting handlebar 1 to rotate clockwise about axis A. This action will also cause front supports 5 to rotate clockwise about axis C and linking rods 3 to rotate counterclockwise around axis B. The carriage then will collapse to a folded position and bearing spring 7 will return stop block 6 to its normal position.

I claim:

1. A foldable baby carriage provided with a safety device to prevent accidental folding thereof, comprising:

a U-shaped handle bar;

a pair of front supports having front wheels mounted at one end thereof;

a pair of rear supports having rear wheels mounted at one end respectively and the end opposite being pivotally connected to the said front supports at ends thereof opposite the wheels and adapted to pivot thereabout in a first direction;

a stop block pivotally mounted at one end thereof on one of said rear supports, disposed with an end opposite the pivotally mounted end normally disposed in an extended position spaced from said one rear support and adjacent to and extending transversely of an end of said handle bar when said carriage is in an upright position;

first bias means carried by said carriage for urging said opposite end of the stop block into its extended position adjacent a lower end of said handle bar;

a pair of linking rods, each pivotally connected at one end to opposite legs of said handle bar and each pivotally connected to each of said rear supports, adapted to pivot in a second direction opposite the first direction the connections being disposed between said stop block and the ends of said rear supports pivotally connected to said front supports, with one of said rods having a stud disposed adjacent said stop block; and a latch member pivotally mounted at a lower end of said handle bar, said member normally engaging the stud; and second bias means carried by said carriage for normally urging said latch into engagement with said stud, whereby, to fold said carriage, it is necessary to both disengage said latch member and depress said stop block against the urging of said first bias means towards said rear support and away from said handle bar end so that the carriage can be folded by rotating said handle bar about its connection to said link rods and said front and rear supports about their pivotal connection in the first direction and moving said link rods about their pivotal connection to said rear supports in an opposite second direction.

* * * * *